United States Patent
Flemmer et al.

[19]

[11] Patent Number: 6,068,442
[45] Date of Patent: May 30, 2000

[54] SCARA ROBOT AND ARTICULATOR

[76] Inventors: Rory C. Flemmer; Luke C. Flemmer, both of Rte. 1, Box 227A, Independence, W. Va. 26374

[21] Appl. No.: 09/074,769

[22] Filed: May 8, 1998

Related U.S. Application Data

[60] Provisional application No. 60/046,167, May 12, 1997.

[51] Int. Cl.[7] .............................. B25J 17/02; B25J 18/00
[52] U.S. Cl. ......................... 414/744.5; 901/15; 901/23; 901/29
[58] Field of Search ........................... 414/74.5; 901/14, 901/15, 23, 28, 29

[56] References Cited

U.S. PATENT DOCUMENTS

| | | | |
|---|---|---|---|
| 4,606,695 | 8/1986 | Lenz | 901/23 X |
| 4,702,668 | 10/1987 | Carlisle et al. | 901/23 X |
| 4,947,702 | 8/1990 | Kato | 901/23 X |

*Primary Examiner*—F. J. Bartuska
*Attorney, Agent, or Firm*—Jaeckle Fleischmann & Mugel, LLP

[57] ABSTRACT

A robot 100 has a pedestal 1, upper and lower arms 5, 12 and a quill 21. A drive train comprises motors in the pedestal 100 coupled to three concentric drive tubes 3, 6, 9. The outer drive tube is coupled to the upper arm 5. Driven tubes 11, 14 extend from the upper arm 5 to the lower arm 14. A twisted belt in the lower arm couples the driven tube 14 to the quill 21. The articulator 400 has three housings 21, 44,45; 61,61a each with an axis of rotation transverse to the its neighbors. Brakes A, B, and C selectively lock two housing together to rotate the third housing.

13 Claims, 4 Drawing Sheets

SCARA ROBOT AND ARTICULATOR

This application claims benefit of Provisional Application Serial No. 60/046,167 filed May 12, 1997.

BACKGROUND TO THE INVENTION

Basic Robot

SCARA (Selective Compliance Automatic Robot Arm) robots are marketed by several manufacturers. All of these robots feature four intrinsic degrees of motion, though devices are sold to offer a further degree or two. Normally the robot has a base which may be bolted to a pedestal. Rising from this base is a column about which may rotate, in the horizontal plane, an arm. This arm has an elbow joint about which may rotate a lower arm, also strictly in the horizontal plane. At the end of this lower arm is a further joint, normally configured as a complex threaded vertical shaft, together with means to control the orientation of this vertical shaft. The threaded shaft fits into a nut which can be rotated to raise or lower the shaft, or "quill." Thus are four degrees of movement provided;

1. Rotation of the upper arm in the horizontal plane
2. Rotation of the lower arm in the horizontal plane
3. Rotation of the vertical quill
4. Vertical movement of the quill.

The complex arrangement of the quill means that the vertical travel is limited to not much more than 12 inches. The motor to rotate the upper arm is often in the robot's base, but the other motors are usually in the arms. Drive from the motors to the axes is either direct or by means of synchronous belts or else steel bands.

Articulator

Providing extra degrees of motion to SCARA's is a difficult matter. Systems with two motors that depend from the final drive flange are on the market. These have a relatively poor strength to weight ratio and are complex and expensive.

SUMMARY OF THE INVENTION

A novel device is described which uses the final drive as the motive force and does not require extra motors. The system consists of three shafts in housings. Each housing has its axis of rotation orthogonal to the housing which precedes it in the drive train. Means are provided so that any two adjacent housing can be locked in their relative rotational positions. Three shafts run through the middle of the housings and each shaft is associated with its neighbors by a right angle bevel gear. The first motion shaft is driven from the motor in the quill such that if all housings are locked and prevented from rotating, the first shaft will turn the second which will turn the third upon which is a drive flange. However, if the drive flange is locked relative to the final housing then there will be a tendency for the housings tendency for the housings to rotate relative to each other. By relaxing the lock between two adjacent housings, it is possible to cause the housing to execute relative rotation.

DESCRIPTION OF THE DRAWING

FIG. 2 (c) is a partial perspective view of the quill and guide rods;

DETAILED DESCRIPTION

Basic Robot

Figure 1:
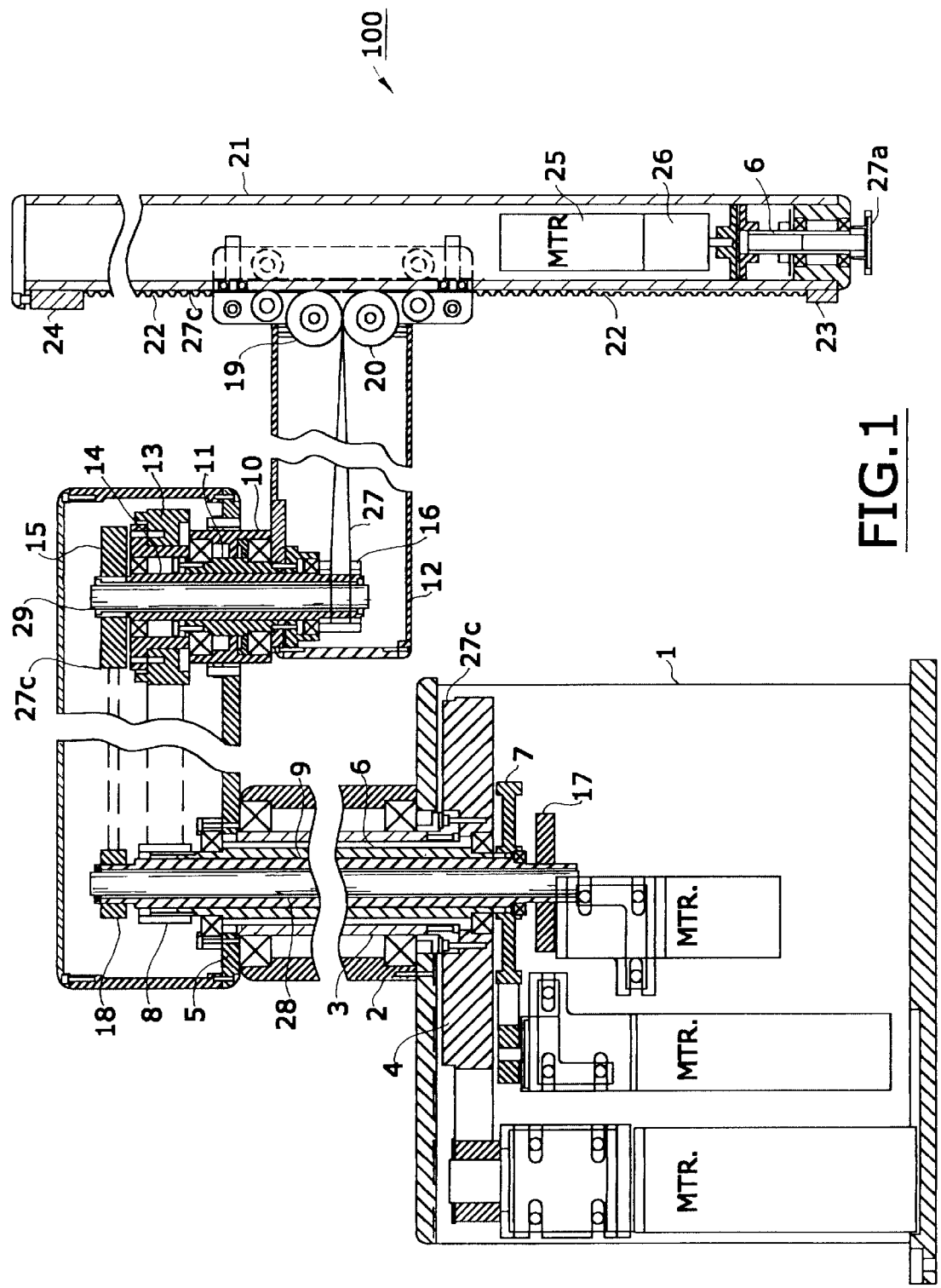
FIG. 1 is a cross sectional view of the robot.

The inventive robot 100 has a large compartment 1 in FIG. 1, which serves as the pedestal. It also serves as a container for three of the four motors and, in addition, optionally, the electronics to control the robot 100. Normally these electronics are partially housed in large remote cabinets connected to the robot with cables.

A sleeve 2 is fixed to the top surface of 1. This sleeve contains bearings through which runs the drive tube 3. Drive tube 3 is affixed at its lower end to a large synchronous belt pulley 4. At its upper end it is bolted to the upper arm 5. Thus rotation of the pulley 4 will rotate the upper arm 5 in precisely the same degree. The drive tube 4 contains bearings wherein rotates concentrically, a drive tube 6. At its lower end it is affixed to a synchronous pulley 7. At its upper end it is affixed to a further synchronous pulley 8. This provides means such that rotation of 7 causes rotation of 8. The drive tube 6 in its turn contains bearings in which can rotate, concentrically, a drive tube 9. Again there are synchronous pulleys attached at the upper and lower ends of this drive tube. This arrangement therefore provides three rotatable drive tubes which can rotate concentrically but independently when driven by the pulleys at their lower ends. Drive tube 9 has a synchronous pulley 18 at its upper end and another one 17 at its lower end. Motors with suitable gearheads are provided within the compartment 1 such that these pulleys 4, 7, 17 can be appropriately driven by the use of synchronous belts. Means are provided for sliding the motors and locking them in position in order to tension the belts. A further set of pulleys and a central concentric tube, 28 is provided. The function of this tube is to ensure safe passage for electrical wires and tubes to pass up the center of the composite structure.

To the distal end of the upper arm 5 is affixed a hub 10. This hub contains two bearings through which passes a drive tube 11. To its lower end is bolted the lower arm 12. To its upper end is bolted a synchronous pulley 13. Rotation of this pulley 13 therefore causes commensurate rotation of the lower arm. Within the drive tube 11 are bearings in which runs a further drive tube 14. To the top end of this drive tube is affixed a synchronous pulley 15 and to its lower end is affixed another synchronous pulley 16. Bearings and a central tube 29 are provided to ensure safe passage of wires and tubes through the center of this structure.

The pulleys 8 and 13 are girdled by a synchronous belt with a suitable idler tensioner device such that rotation of pulley 7 leads to a proportional rotation of the lower arm 12. Pulleys 15 and 18 are similarly girdled such that rotation of 17 leads to a proportional rotation of 16.

Idler pulleys 19 and 20 are positioned at the distal end of the lower arm. They are arranged so that the lower pitch surface of 19 and the upper pitch surface of 20 are both at the same height as the centerline of the pulley 16. This is done to minimize distortion of the drive belt. It allows the belt teeth to mesh cleanly, even though the belt is twisted through 90 degrees.

A quill 21 is arranged as to move vertically within a guidance system at the end of the lower arm 12. A synchronous belt 22 is attached to the lower end of the quill at 23. It passes over the idler pulley 20, around the drive pulley 16, under the idler pulley 19 and is attached, with means for tensioning at the top of the quill at 24. Thus any rotation of the pulley 17 will lead to rotation of the drive pulley 16 and thus to vertical movement of the quill 21. This arrangement permits the quill to have a very large stroke.

Within the bottom end of the quill is affixed a motor 25 with gearhead 26. A drive shaft 27 is driven via a coupling and suitable support bearings by the output shaft of the gearhead 26. A flange 27a is affixed to the end of the drive shaft.

Each of the four motors has an encoder. In addition, encoders are provided at the endpoint of each motion except the final rotation of the motor 25 so that allowances can be made for the imprecisions of synchronous belt drives. These encoders can be magnetically encoded strips 27c wound around the pulleys 4 and 13 and fixed linearly to the quill 21, together with reading heads. These well known components are commercially available and provide a reading of position at the point of final action and are independent of imprecision of the synchronous belts.

A commercially available control printed circuit board, resident in a computer, is fed with these seven encoder signals and has suitable software and is otherwise capable of reconciling encoder readings so that the end motion is accurate, notwithstanding the vagaries of synchronous belt drive. Thus, those skilled in the art can program a computer such that desired motions will be mediated by this control unit and result in precise movement of the end drive flange 27a in four degrees of freedom, when driven by the four motors through appropriate hardware.

In addition to these encoders, a further set of absolute encoders is provided so that the unit can evaluate its joint positions at start up, without excessive movement. These take the form of thin metal disks attached to the pulleys 4 and 13 and to the drive flange 27. In addition a linear scale is attached to the quill 21. These encoder discs and scale have slits cut into their edges such that a light beam can be interrupted by the motion of the slit. The position of these slits is arranged so that their spacings follow an increasing progression. A light interruption module is positioned so that movement of the disc or scale leads to characteristic signal from the light interruption module. This signal is fed back to the controlling computer. At startup, the computer can mandate a slow move of all four motors and by monitoring the signals which it obtains from these absolute encoders, can infer the exact position of each axis with limited total motion.

Figure 2C:
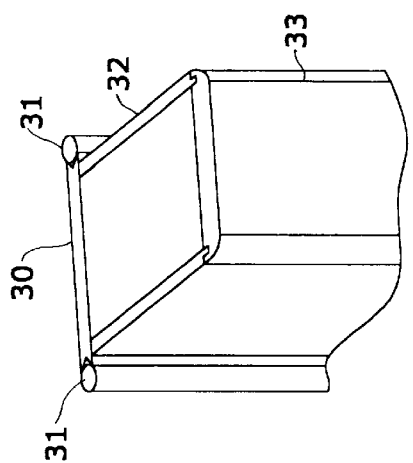
FIGS. 2 (a) and (b) are rear and side views of the quill guide.
Figure 2B:
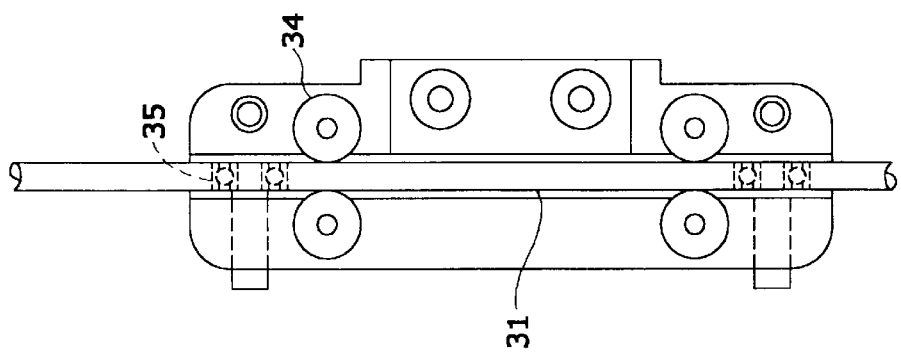
Figure 2A:
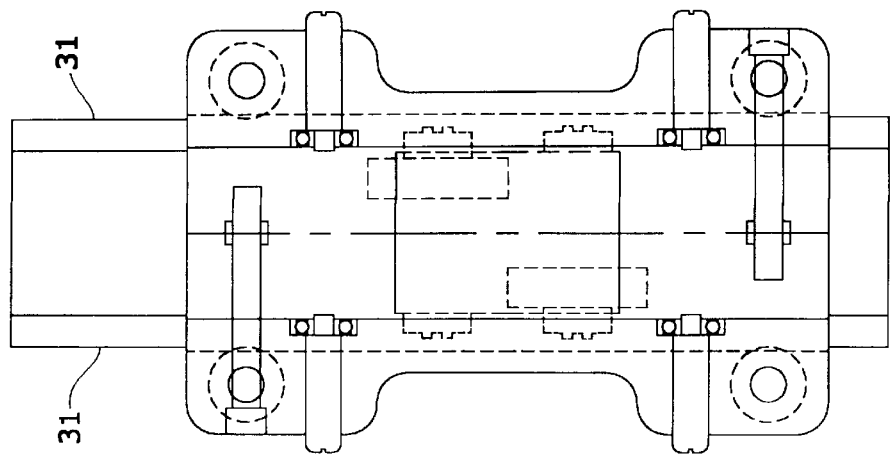

FIGS. 2(a–c) shows the arrangement of the quill guidance system. In one configuration, the quill is formed upon a flat plate 30. This baseplate has grooves along opposing edges, wherein can nestle hardened circular steel rods 31. These rods are affixed to the base by screws. Sides 32 are constructed from plate and bolted or cast onto the base in order to provide a compound structure of considerable rigidity. A cover 33 is bolted onto the front of the structure. The hardened rods 31 run within four sets of three cam followers each.

Figure 3:
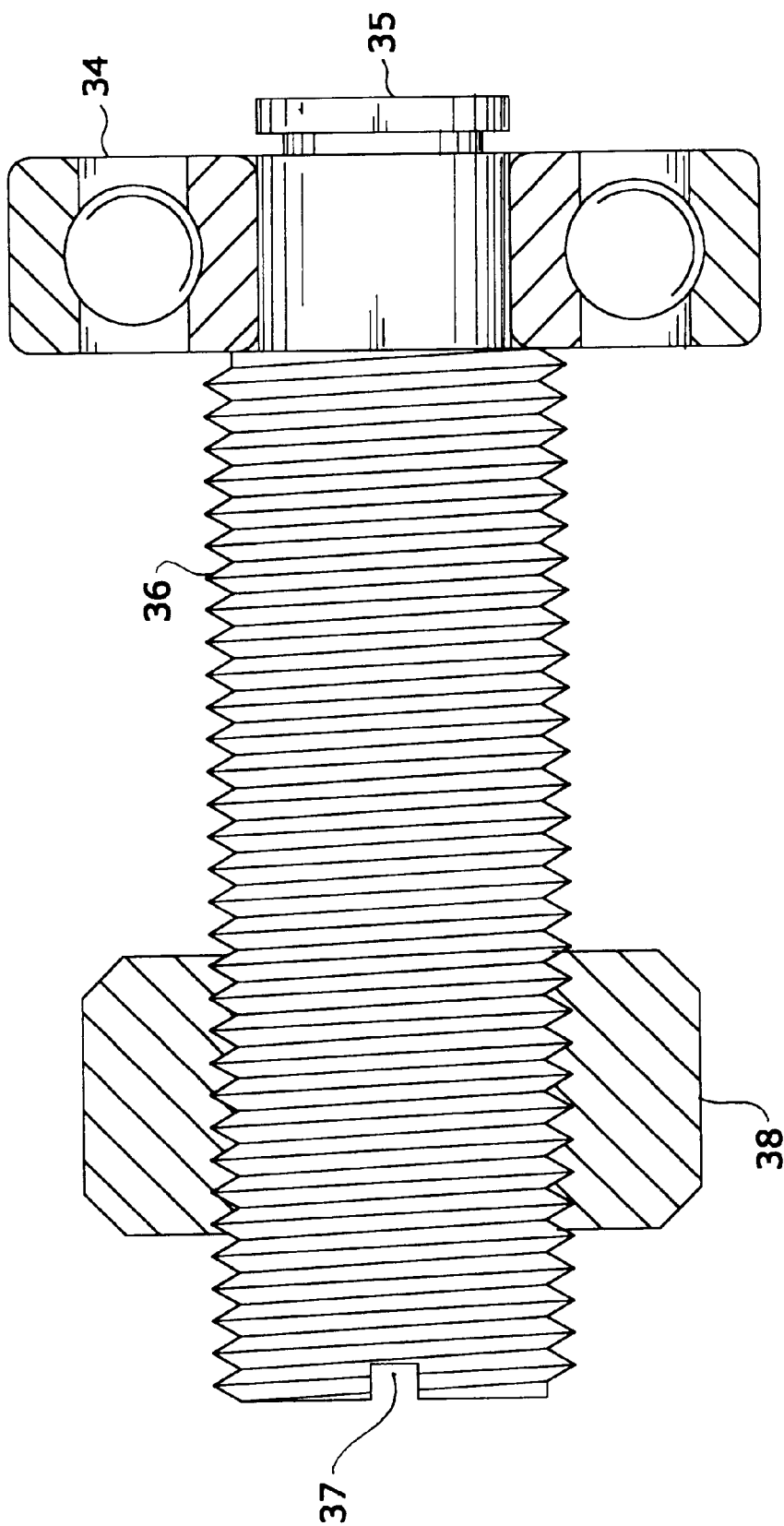
FIG. 3 is a sectional view of the cam follower.

In FIG. 3, each cam follower is composed of a commercially available ball bearing 34, with heavy outer race. Each bearing 34 fits upon an eccentric shaft 35, retained by a snap ring. This shaft is a portion of a larger threaded shaft 36, with screw driver slot 37 and locknut 38. By rotating this unit by means of a screwdriver, the cam followers 34 may be adjusted to bear correctly against the hardened rods 31. The locknuts 38 may then be tightened to secure the arrangement.

In this way the quill may slide up and down with very little friction, but, at the same time be very firmly guided so that it may not move laterally.

Articulator

Figure 4:
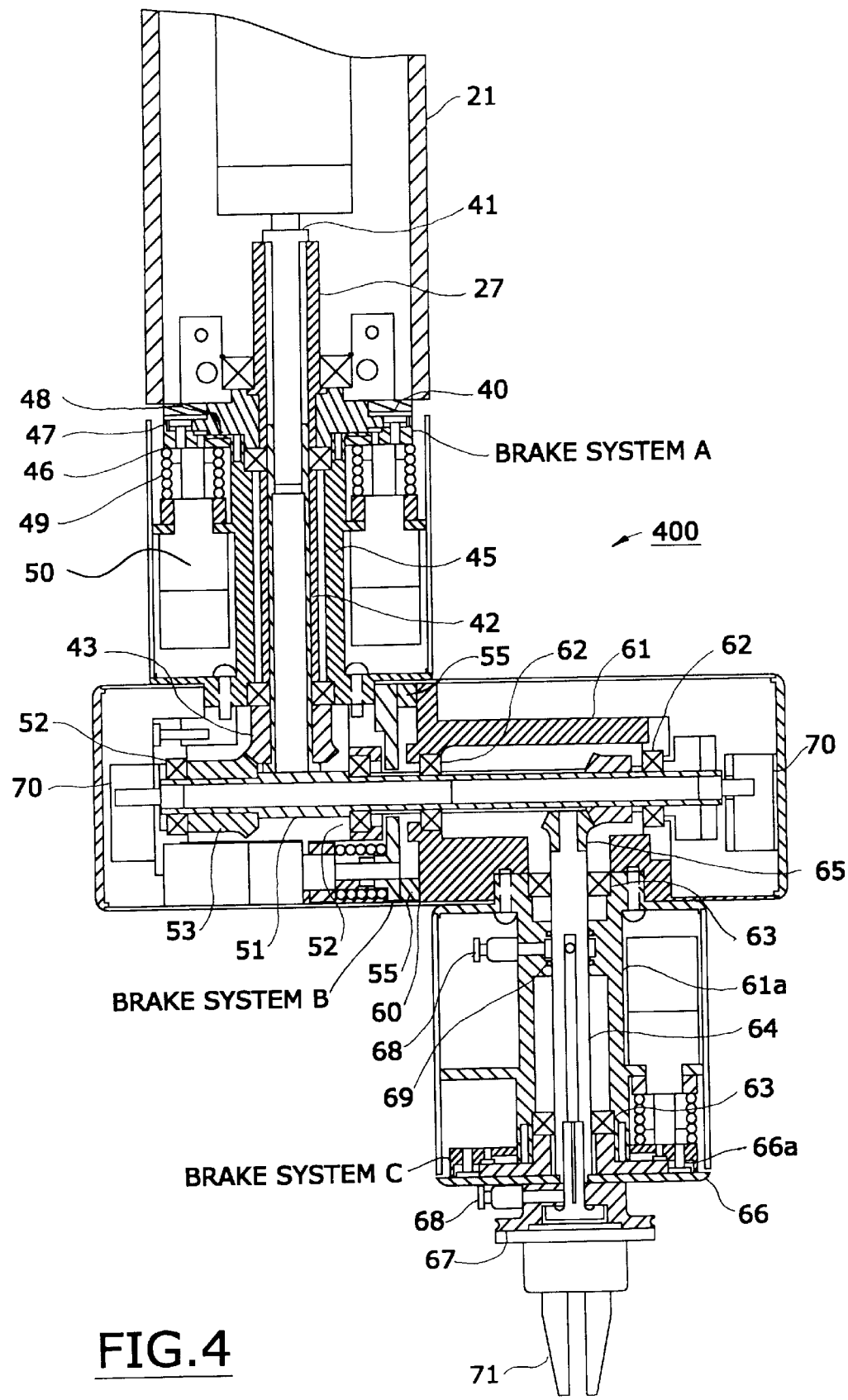
FIG. 4 is a sectional view of the articulator.

One realization of this principle is depicted in FIG. 4. Articulator 400 provides two further degrees of motion. The articulator 400 may bolt onto the drive shaft 27 in FIG. 1 and in FIG. 4 in place of the flange 27a in FIG. 1. A steel brake disk, 40 is attached to the quill body 21. A bolt 41 and suitable spacers permits the drive flange 27 to be rigidly connected to the first motion shaft 42. The arrangement is such that the very large tensile force of the bolt is transmitted down the spacers which surround the shaft. In this way, the radius arm of the torque is increased and there is adequate resistance to torque and bending moments. A helical bevel gear 43 is rigidly held on the end of the shaft 42 by the spacers. Bearings are provided such that the shaft is firmly located axially within the first housing 45 but is free to rotate within the housing. A circular brake shoe 46, covered with friction material 47 is fixed to the housing 45 by means of a thin sheet of spring steel 48. This prevents any rotation of the brake shoe relative to the housing 45 but allows some axial float of the brake shoe 46 within the limits of elasticity of the sheet 48. Two springs 49 and two air cylinders 50 placed diametrically opposed to each other provide means whereby the brake shoe 47 can be withdrawn from contact with the brake disc 40, thus allowing the housing 45 to rotate freely with respect to the quill 21. When pressure is released from the air cylinders 50, the springs 49 will cause the brake shoe 46 to bear strongly against the brake disc 40 and thus prevent relative movement between the housing 45 and the quill 21. That is brake system A. As an alternative, an annular air cylinder arrangement could be used whereby an annular piston sealed by O rings could slide axially around the center shaft 42.

The housing 45 is firmly bolted to a housing 44 to make the two housings integral. This housing 44 contains a shaft 51, running in bearings 52. A bevel gear 53, pressed onto this shaft runs together with the gear 43 to provide drive to this shaft from the primary shaft 42. A braking system similar to the first system is deployed upon this structure and permits force to be applied to braking material 55 such that it will rub against a brake disc 60. Brake system B includes a brake disc 60 that is integral with the housing 61 which is bolted integrally to housing 61a. The shaft 51 extends out of the housing 44 and protrudes into housing 61, being suitably supported in bearings 62. The integral housings 61, 61a have bearings 63 wherein runs a shaft 64 onto which is pressed a bevel gear 65. A brake system similar to that previously described allows friction material 66a, structurally integral with the housing 61, 61a to rub against a brake disc 66 which is integral with the output shaft 64. That is brake system C.

The output shaft 64, for convenience, provides a rotatable air supply 68, with 'O' ring seals 69 so that grippers 71 attached to the output flange 67 can be air operated and have unlimited rotation without restriction.

Two dynamic encoders 70 are affixed to the housings 41, 41a and 61, 61a so that they can measure the relative motion of shaft 51 with respect to the housings. The drive motor 25 in FIG. 1 also has an encoder. Means are provided for a computer to read and report the values given by these three encoders. Means are also provided that air solenoids can be switched under computer control, to activate any or all of the three brake systems.

METHOD OF OPERATION

In order to control the orientation of the output flange, brake system (C) is released. Then there is no restriction to the rotation of the output shaft 64 with respect to the housing 61, 61a. Brake systems A and B are locked thus the quill, housing 44, 44a and 61, 61a are rigidly juxtaposed. In this condition, any rotation of the motor 25 will operate through the gearhead, output flange 27, shaft 42, shaft 51, and shaft 64 to rotate the final flange 67.

If only brake A is released and brakes B and C are locked, then any rotation of the shaft 27 will cause housing 44, 44a to rotate with the shaft 27. Since housing 61, 61a and flange 67 are locked together, they will both rotate together.

Similarly, if only brake (B) is released then relative motion between housings 44, 44a and 61, 61a can be accomplished.

By reading the encoders 7 and the encoder of the motor 25, and knowing the relative gear ratios, those skilled in the art can execute precise control of the end effector flange 67 in three degrees of motion by controlling each motion sequentially.

I claim that:

1. A robot comprising:
   a pedestal for housing three motors;
   three concentric drive tubes, each with one end in the pedestal and a pulley on the end in the pedestal;
   three belts, each belt coupling the output of one of the motors to one of the pulleys in the pedestal;
   an upper arm disposed over the pedestal and housing the other ends of the drive tubes, the outer drive tube coupled to the upper arm for rotating the upper arm in a first plane;
   two concentric driven tubes, each with one end in the upper arm and a pulley on the end in the upper arm;
   two belts, each belt coupling a pulley of one the drive tubes in the upper arm to one of the pulleys of a driven tube in the upper arm;
   a lower arm disposed under the upper arm and housing the other end of each of the driven tubes, the outer driven tube coupled to the lower arm for rotating the lower arm in a second plane and a pulley on the end of the inner driven tube in the lower arm;
   a pair of idler pulleys in the lower arm;
   a belt around the pulley on the inner driven tube and passing between the idler pulleys;
   a quill coupled to the idler pulleys for traveling in a direction transverse to the first and second planes of rotation of the respective upper and lower arms.

2. The robot of claim 1 further comprising a fourth motor in the quill having an output shaft for turning in a plane of rotation parallel to the first and second planes of rotation.

3. The robot of claim 1 wherein the belts are synchronous belts.

4. The robot of claim 1 comprising one or more encoders, each encoder coupled to a motor for generating a signal representative of the angular position of the motor shaft.

5. The robot of claim 1 further comprising a linear encoder coupled to the quill for generating a signal representative of the linear position of the quill.

6. The robot of claim 2 further comprising control means coupled to each of the motors for selectively operating one or more of the motors to position the upper arm, lower arm and quill.

7. The robot of claim 6 further comprising one or more displacement encoders coupled to the control means and to the motors and to the quill for generating signals representative of the positions of the motors and the quill.

8. The robot of claim 6 further comprising an articulator on the end of the quill, said articulator comprising:
   three housings, each housing having an axis of rotation, any two neighboring housings having axes of rotation that are transverse relative to each other, one housing having an axis of rotation transverse to the axes of rotation of the other two housings; and
   means for selectively locking together two of the housings in order to turn the two locked housings about the axis of rotation of the other housing.

9. The robot of claim 8 wherein the articulator comprises:
   a first housing for supporting a first shaft and one end of a second shaft, said first shaft having one end connectable to a quill shaft and a first right hand bevel gear at its other end and the second shaft having a right hand bevel gear coupled to the right hand bevel gear of the first shaft;
   a first brake for selectively locking the first housing to the quill;
   a second housing for supporting the other end of the second shaft and one end of a third shaft, the ends of the second and third shafts in the second housing each having a right "angle" bevel gear and said bevel gears coupled to each other;
   a second brake for selectively locking the second housing to the first housing;
   a third housing for supporting the other end of the third shaft, an output flange coupled to the other end of the third shaft; and
   a third brake for selectively locking the output flange to the second housing.

10. The articulator of claim 8 further comprising;
    means for sensing the position of each housing and means for selectively operating two of the three brakes to turn one of the housing in a selected direction.

11. The articulator of claim 10 wherein the means for sensing the position of the housings are encoders wherein each encoder generates a signal representative of the position of a housing.

12. The articulator of claim 9 wherein each brake comprises a brake disc mounted on one housing and a pair of brake cylinders mounted on a housing opposite the brake disc, said cylinders holding having moveable rods with brake shoes mounted on the ends of said rods for engaging the opposite brake disc and locking the housing together.

13. The articulator of claim 9 further comprising pneumatic grippers mounted on the end of the output flange.

* * * * *